United States Patent [19]

Farsai

[11] Patent Number: 5,433,581
[45] Date of Patent: Jul. 18, 1995

[54] WHEELCHAIR LIFT WITH AUTOMATED FOLDING PLATFORM

[76] Inventor: Ali J. Farsai, 7241 NE. 160Th. St., Bothell, Wash. 98011

[21] Appl. No.: 178,051

[22] Filed: Jan. 6, 1994

[51] Int. Cl.⁶ .............................................. B60P 1/48
[52] U.S. Cl. ................... 414/546; 414/917; 414/921; 414/556; 254/10 R
[58] Field of Search ............... 414/921, 539, 540, 541, 414/543, 462, 542, 545, 546, 550, 556, 557, 558, 628, 629, 672, 917, 663, 662; 254/2 R, 3 R, 3 C, 10 R, 10 C

[56] References Cited

U.S. PATENT DOCUMENTS

| | | | |
|---|---|---|---|
| 3,913,759 | 10/1975 | Deacon | 414/921 X |
| 4,140,230 | 2/1979 | Pearson | 414/546 |
| 4,551,056 | 11/1985 | Risner | 414/539 |
| 4,664,584 | 5/1987 | Braun et al. | 414/921 X |
| 5,111,912 | 5/1992 | Kemef | 414/921 X |
| 5,261,779 | 11/1993 | Goodrich | 414/921 X |

FOREIGN PATENT DOCUMENTS 186542 11/1982 Japan ................................... 414/921

Primary Examiner—Frank E. Werner

[57] ABSTRACT

A wheelchair lift with hydraulic power unit and automated folding platform for installation on the floor, inside the opening defining walls of a vehicle to provide for loading and unloading of wheelchair occupants to and from the vehicle. Completely automated, retractable, collapsable folding platform. Hydraulic power unit (10) of the lift and the hydraulic cylinder (28) are totally enclosed, and contained in the power box. The power unit provides power for upward motion of the platform and gravity descent for downward motion of the platform. The platform is pivotally retracted and held in a vertical position in half of the opening space of the vehicle door. The folding motion is accomplished by a folding arm driven against a cam roller which starts the motion of the ball joint linkages inside the platform tubing structure. This initiates a resulting revolving motion of one half section of the platform which folds the platform in a smooth uninterrupted continuous manner.

1 Claim, 2 Drawing Sheets

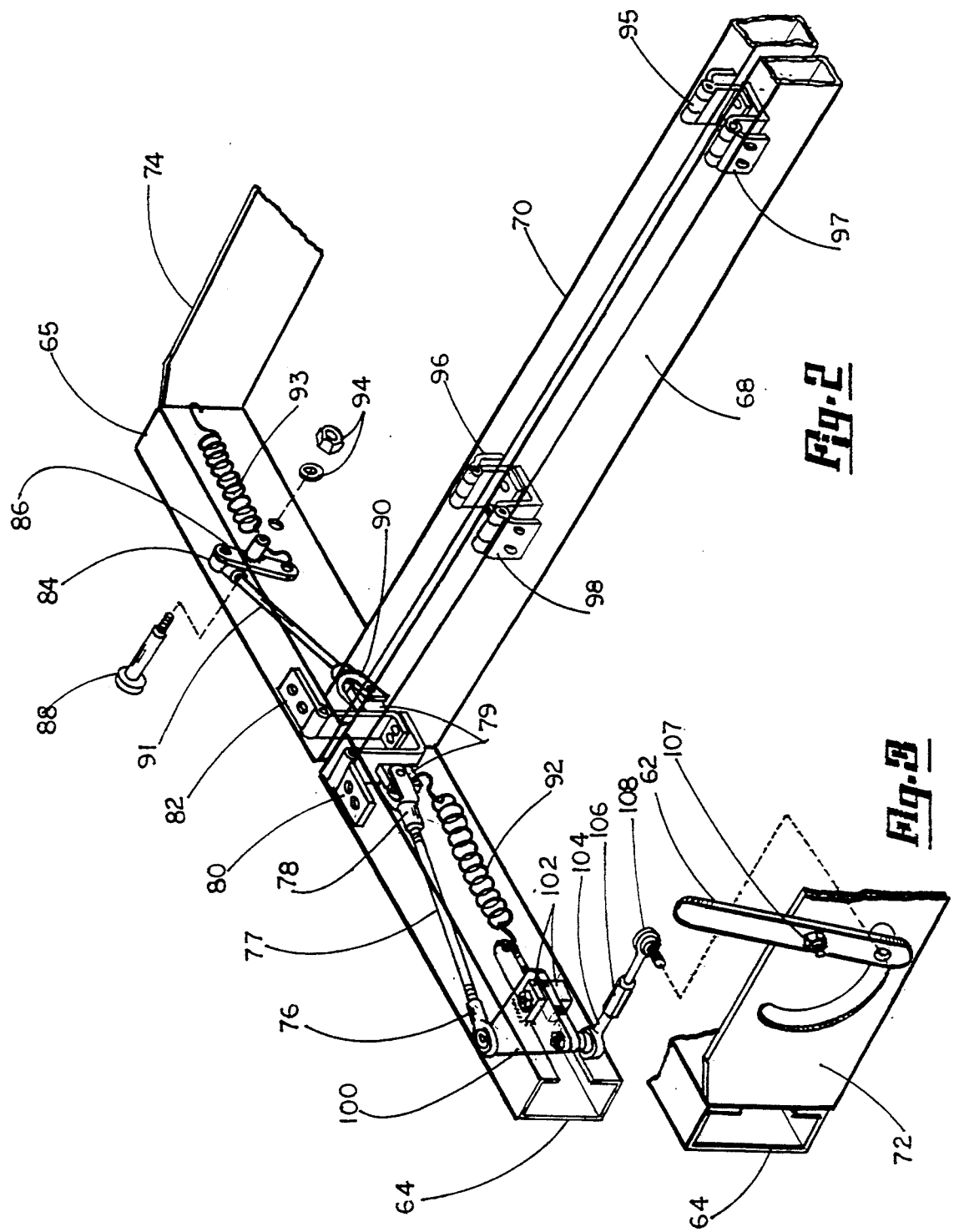

WHEELCHAIR LIFT WITH AUTOMATED FOLDING PLATFORM

BACKGROUND—FIELD OF INVENTION

This invention relates to wheelchair lift for transit vehicles specially to an "Improved Power Unit" and Automated Folding Platform.

BACKGROUND—DISCUSSION OF PRIOR ART

Wheelchair lift previously referred to as "powered loading platform" in U.S. Pat. No. 4,140,230 to Pearson, Feb. 20, 1979 discloses electromechanical power unit by adopting ball screw and bevel gear and linkage assembly which results in a power unit box which is bulky in size, and requires intensive maintenance and is undesirably noisy. The platform of the prior art is only manually foldable.

Such manual operation of wheelchair lift platform which is intended for a disabled person requires assistance of a second person and is not by all means desirable; especially to those wheelchair occupants who are also independent drivers as well.

In the prior art the term "powered loading platform" used repeatedly implies to a lift with manually operated platform where as in my invention ,folding of the platform is fully automated as will be described in detail in the description of my invention.

Although my invention and the prior art share a minor physical resemblance, my invention greatly differs in the novelty features. However, the common areas of similarity rests on:

a. Use of parallelogram linkage theorem which has been an academic principal in mechanics and kinematics text books and has a history of adoption in various fields for over 180 years.

b. Segmented hinged platform which has also been in use in the military and the cargo air-crafts for many decades.

Obviously, neither prior art, nor my invention can solely rely explicitly on the above mentioned aspects of invention as a part of novelty features.

OBJECTS AND ADVANTAGES

Accordingly, several objects and advantages of my invention are the power unit which is comprised of a safe, powerful, state of art compact hydraulic power unit and hydraulic driven chain and sprocket system that requires no maintenance.

The power unit box is compact, therefore requires less space thus the unit becomes feasible for installation in Mini-Vans.

The descending travel motion of the lift's platform either loaded or unloaded is by means of gravity, which provides safe and accident free coasting downward.

The automated folding and unfolding feature of the platform in my invention provides the ultimate safe, and effortless independent operation without assistance by handicapped wheelchair occupant who may also be the driver of the vehicle.

DESCRIPTION OF DRAWINGS

FIG. 2 shows an isometric view of the platform structure, depicting the automatic folding mechanisms inside the main tubing structures, assuming as if the tubing was made of transparent material to reveal internal mechanisms.

FIG. 3 shows a fragmentary isometric view of an enlarged scale of the same embodiment defining side wall of the LH. platform in FIG. 2.

REFERENCE NUMERALS IN DRAWINGS

Figure 1:
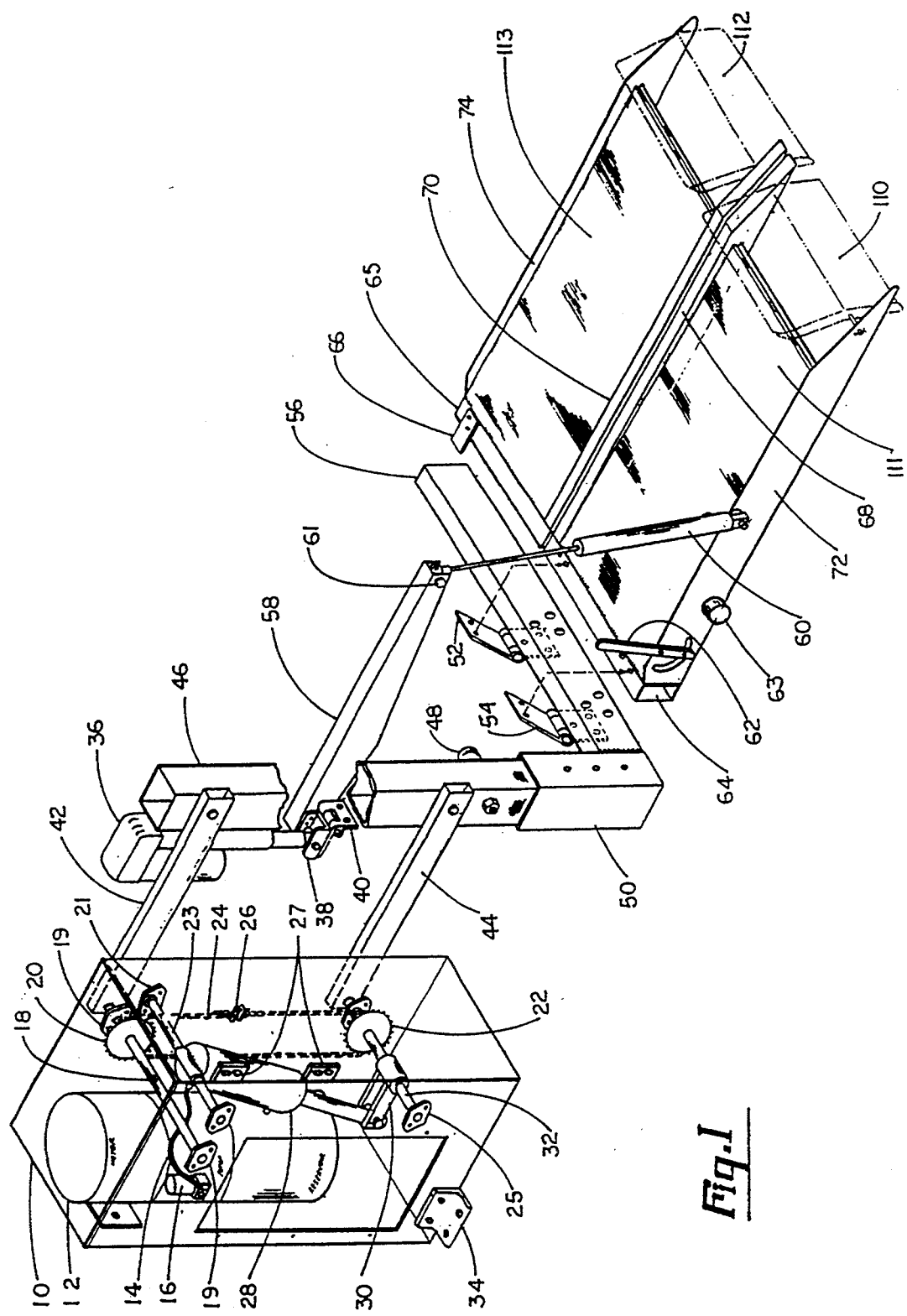
FIG. 1 shows an isometric view of my invention, depicting the power unit in detail assuming as if the power unit box walls were made of transparent material to reveal internal components.

| | | | |
|---|---|---|---|
| 10- | Power box | 12- | Compact hydraulic power unit |
| 14- | Hydraulic hose | 16- | Solenoid valve |
| 18- | Keyed shaft | 19- | 2 hole pillow block bearing |
| 20- | Sprocket | 21- | 2 hole pillow block bearing |
| 22- | Sprocket | 23- | Shaft |
| 24- | Double strand chain | 26- | Chain tensioner/connector |
| 27- | Power box connecting ears | 28- | Hydraulic cylinder |
| 30- | Lever arm | 32- | Shaft with key-way |
| 34- | Mounting bracket | 36- | Electric linear actuator |
| 38- | Mounting bracket | 40- | Folding up hinge |
| 42- | Upper parallelogram arm | 44- | Lower parallelogram arm |
| 46- | Support column | 48- | Cam roller |
| 50- | Adjustable support boot | 52- | Hinge |
| 54- | Hinge | 56- | Support arm |
| 58- | Folding arm | 60- | Spring loaded strut |
| 61- | Pin | 62- | Folding arm |
| 63- | Locking bumper | 64- | Platform structure LH |
| 65- | Platform structure RH | 66- | Support bridge |
| 68- | Platform structure LH | 70- | Platform structure RH |
| 72- | Platform side wall plate LH | 74- | Platform side wall plate RH |
| 76- | Ball joint | 78- | Rod clevis |
| 79- | Hinge mounting bracket | 80- | Hinge LH |
| 82- | Hinge RH | 84- | Ball joint |
| 86- | Rocker arm | 88- | Stud bolt |
| 90- | Rod clevis | 91- | Linkage |
| 92- | Spring | 93- | Spring |
| 94- | Nut & washer | 95- | Hinge |
| 96- | Hinge | 97- | Hinge |
| 98- | Hinge | 100- | Triangular pivot plate |
| 102- | Ear stubs | 104- | Ball joint |
| 106- | Adjusting turn buckle | 107- | Stud bolt |
| 108- | Ball joint | 110- | Stop ramp flap LH |
| 111- | Platform LH | 112- | Stop ramp flap RH |
| 113- | Platform RH | | |

DESCRIPTION—FIGS. 1 to 3

A typical embodiment of my present invention is illustrated in FIG. 1. The power unit box 10, in FIG. 1 is drawn with the understanding that, for the purpose of showing all the componentry and their relative positions; to be assumed as if transparent material. Inside the power unit box 10,a compact hydraulic unit 12 consisting of motor, pump, reservoir, and solenoid valve 16 is bolted to the interior wall. The output port of the solenoid valve 16 is connected via hydraulic hose 14 to the hydraulic cylinder 28. The said hydraulic cylinder is suspended via shaft 23 which is supported by two identical 2 hole pillow block bearings 21 to the walls of the said power unit box. The rod end of the said cylinder is connected to the lever arm 30 which is fastened to shaft 23 by means of key-way and key to the said shaft 32. To the said shaft is mounted sprocket 22 by means of keyway. The said shaft 32 is supported by 2 identical pillow block bearings 25 to the said interior walls of the said power unit box 10. The said shaft is extended through a hole slightly larger in diameter than the shaft on the wall of the power unit box to the outside of the said power unit box in order to receive weldment joint to the parallelogram arm 44.

The said sprocket 22 is connected to the sprocket 20 by chain 24. Adjustable tensioner 26 provides proper tension and connection of the chain ends. The upper sprocket 20 is mounted on the shaft 18 by means of key-way and key. The said shaft is also extended through a hole slightly larger in diameter than the shaft diameter to the outside of the said power unit box,in order to receive weldment joint to parallelogram arm 42. The said shaft 18 is supported by means of 2 identical pillow block bearings to the internal confined walls of the power unit box.

The upper and lower parallelogram arms 42 and 44 are connected to the support column 46. The said support column is inserted inside an "L" shaped adjustable support boot 50 and support arm 56. Two identical hinges 52 and 54 are attached to the said support arm. The said hinges will have their free leaves bolted to the LH platform structure 64. The said platform structure 20 bears the left hand portion of the full platform. The adjacent platform structure 65 bears the right hand half portion of the full platform. The said structures 64 and 65 are individually connected to members 68 and 70 by means of weldment,in order to form two individual "L" shaped structures.

The welded joint is constructed by overlaying the long leg of the said "L" shape 68 over 64 and 70 over 65, not vice versa. It will be noted that the in-line opening of the pieces 64 and 65 is to provide housing for the combined folding mechanisms.

The two "L" shape structures 68 and 70 are pivotally connected longitudinally by means of 3 sets of hinge assemblies which are composite and each set is produced by adjoining the individual hinges 95 to 97,and 96 to 98,and 80 to 82 as shown in FIG. 2. Thus the two halves of the platform structure 111 and 113 FIG. 1 become pivotally rotatable 180 degrees upward. Obviously 4 cut openings are provided in the members 68 and 70 for the free movement of the composite hinges.

FIG. 3 shows the folding arm 62 which is pivotally connected to the side wall 72. The said holding arm is connected to the ball joint 108 of the linkage comprised of the adjustment turn buckle 106 and another ball joint 104.

The said ball joint is pivotally connected to a triangular pivot plate 100 which pivots inside the ear stubs 102 and the slot provided in the platform structure 64. The linkage 77 is connected to the member 100 with the ball joint 76 and clevis 78 to the hinge mounting bracket 79 of hinge 80.

The adopted spring 92 provides the proper tension for the linkage,and causes the said·folding arm 62 to return and remain in the position shown in FIG. 3.

The hinge 82 inside the platform structure 65 is connected to linkage 91 by clevis 90 at one end and ball joint 84 to the rocker arm 86 at the other end. The said rocker arm receives stud bolt 88 at the center where pivots. The spring 93 provides the proper tension for this linkage assembly.

To the support column 46 in FIG. 1 an adopted 12 volt DC electrical actuator 36 with internal limit switches is pivotally attached (not shown). The rod end of the said linear actuator 36 is pivotally connected to the bracket 38 and the said bracket is fixedly mounted on one leaf of the adopted hinge 40. The other leaf of the said hinge is fixedly bolted to the support column 46. Folding arm 58 is of channel shape form and is fixedly attached to one side of the bracket 38 at one end, and pivotally connected by ball joint to the spring loaded struts 60 by pin 61 at other end. The said spring loaded struss is of retracting tendency nature proportionate to the total weight of the platform and is pivotally connected to the platform side-wall plate 72.

OPERATION—FIGS. 1, 2, 3

The power box in FIG. 1 is installed inside on the floor of the wheelchair transport vehicle, with bracket 34 and another on the opposite side ( not shown) and the connecting ears 27 to the side support structure of the vehicle in the location adjacent to the side sliding door, in such a manner to allow for freedom of movement of the parallelogram's arms 42 and 44 to extend outward of the vehicle door opening confinement.

By starting the motor of the hydraulic unit 12 (via remote control or extended cord push button control box hand hold size) simultaneously the solenoid valve 16 is energized thus allowing the hydraulic fluid to be transferred at 2500 PSI to the cylinder 28 thus extending the cylinder rod.

The extension of the said cylinder rod will push the lever arm 30 downward causing counter-clock-wise rotation of the 32 and sprocket 22 while the same rotation is being transferred to the upper sprocket 20 and shaft 18 by means of chain,resulting the parallelogram arms 42 and 44 to move upward,and move the support column 46 and boot structure 50 and platforms 111 and 113 vertically upward until it reaches the floor level of the vehicle where as the wheelchair can be rolled away.

THE AUTOMATIC FOLDING OPERATION OF THE PLATFORM IS AS FOLLOWS:

The linear actuator 36 when energized, will close the pivoting leaf of the hinge 40 thus lifting the folding arm 58 and struts 60 and eventually revolving and lifting the platform along the axis of the hinges 52 and 54 FIG. 1.

When approximately 20 degrees of vertical revolving is in progress, the folding arm 62 comes in contact with the cam roller 48 FIG. 1 and radially pivots forward FIGS. 1,3 resulting the ball joint linkage FIG. 2 to be pushed to pivot the triangular pivot plate 100 to pivot around it's fixed pivotal axis inside the ear stubs 102 which in turn will push the linkage 77 forward and thus the hinge assembly 80 forward.

The forward motion is transferred to the 2nd hinge assembly 82 resulting the RH half of the platform 113 to fold 90 degrees upward along the axes of hinges 80, 98, and 97.

In order to achieve complete folding (180 degree) of platform 113 over platform 111 the second assembly of mechanisms situated inside of the tubing structure 65 will begin to function, given 60 degrees approach towards vertical stowing position is now being reached and 75% of the effective weight is decreased because of centroidal shifting of the mass; allowing the spring 93 to retract, tending to push the rocker arm 86 and the linkage 91 forward. Obviously this would be impossible, therefore as a result the whole tubing structure 65 will rotate along the axes of hinges 82, 96, and 95 causing additional 90 degree rotation of platform 113 over platform 111.

In actuality, there is no pause or interruption evident in the folding sequence. Once the motion starts, folding occurs vigorously and steadily, in 3 seconds.

Unfolding of the platform is by retract action of the linear actuator which will result in the reverse function of the entire folding mechanisms.

Lowering of the platform is by controlled action of gravity, when the solenoid valve 16 is de-energized, the valve spool opens the port, and the moment force created by the platform structure will crank the lever arm 30 upward, pushing the hydraulic fluid from the hydraulic cylinder to return to reservoir resulting in the platform smoothly and quietly coasting to the ground level. A built-in flow control in the system will provide controlled desired travel speed.

Accordingly the reader will see that the wheelchair lift with automated folding feature and hydraulic power unit of my invention is quiet, compact, powerful for heavy wheelchair occupants, safe and maintenance free allowing it to be installed more quickly inside the smaller and more economical vehicles such as mini vans.

The automatic folding feature of the platform is extremely useful for all handicapped wheelchair occupants without the necessity for second party assistance, and provides more independence to those who are also the drivers of the vehicle and can not operate folding and stowing of the platform manually.

I claim:

1. A wheelchair lift with hydraulic power unit system box and automated folding platform comprising of:

a power unit drive box mounted on a floor inside an opening defining wall of a vehicle;

said drive box having a hydraulic motor, pump, reservoir and valves in an enclosed enclosure attached to an interior wall of the power unit box;

a hydraulic cylinder pivotally suspended inside the power box;

a crank arm pivotally connected to a rod end of the said cylinder;

said crank arm revolving a plurality chain driven sprockets;

movement transferring linkage (parallelogram) attached to extended sprocket shafts outside of the power unit box;

whereby the said linkage receives movement from the said chain driven sprockets and the said linkage vertically swings an "L" shape cantilever arm wherein the said "L" shape cantilever arm is pivotally attached to one segment of combined platform segments by means of hinges;

said one segment of the platform being further pivotally attached by means of a plurality of concealed hinges to another segment of the platform and foldable upwardly 180 degrees along a hinged axis;

the said combined platforms receiving a folding motion from an action of a pivotal arm against a roller attached to a column of the said "L" shape cantilever arm during swinging movement for stowing; and the said combined platforms receiving transference motions for folding from a plurality of motion translating linkages and mechanisms situated inside of a rectangular tubing structure of the two platform segments;

whereby the folding motion produced by the action of the hydraulic cylinder pivotally attached to the said "L" shape cantilever arm is carried via a folding arm and a spring loaded strut to one sidewall of the combined platform wherein spring means normally urge the second platform segment to an inoperative position;

and said plurality of linkages and mechanisms concealed in said rectangular tubing structure of the said platform being terminally attached to the said another platform segment urging it to fold over in an overlay position while the combined platform is being retracted to a vertical position for stowing.

* * * * *